No. 780,721. PATENTED JAN. 24, 1905.
F. M., E. A. & W. M. LOXLEY.
CULTIVATOR ATTACHMENT.
APPLICATION FILED APR. 7, 1904.
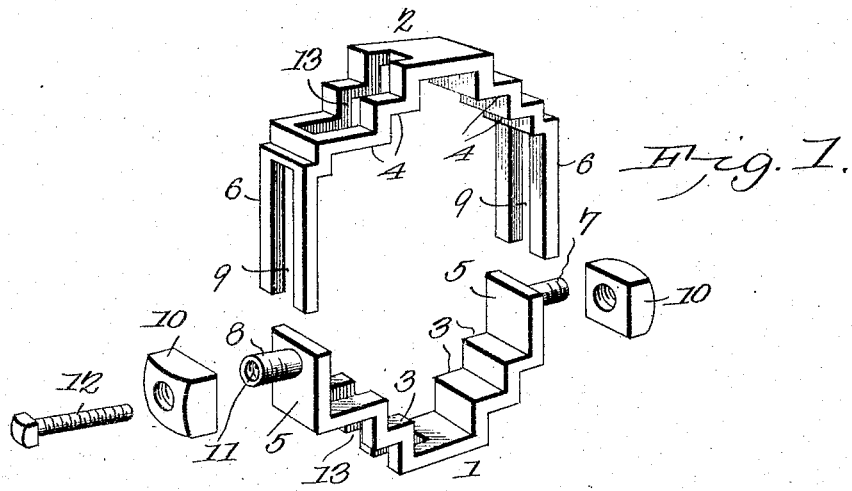
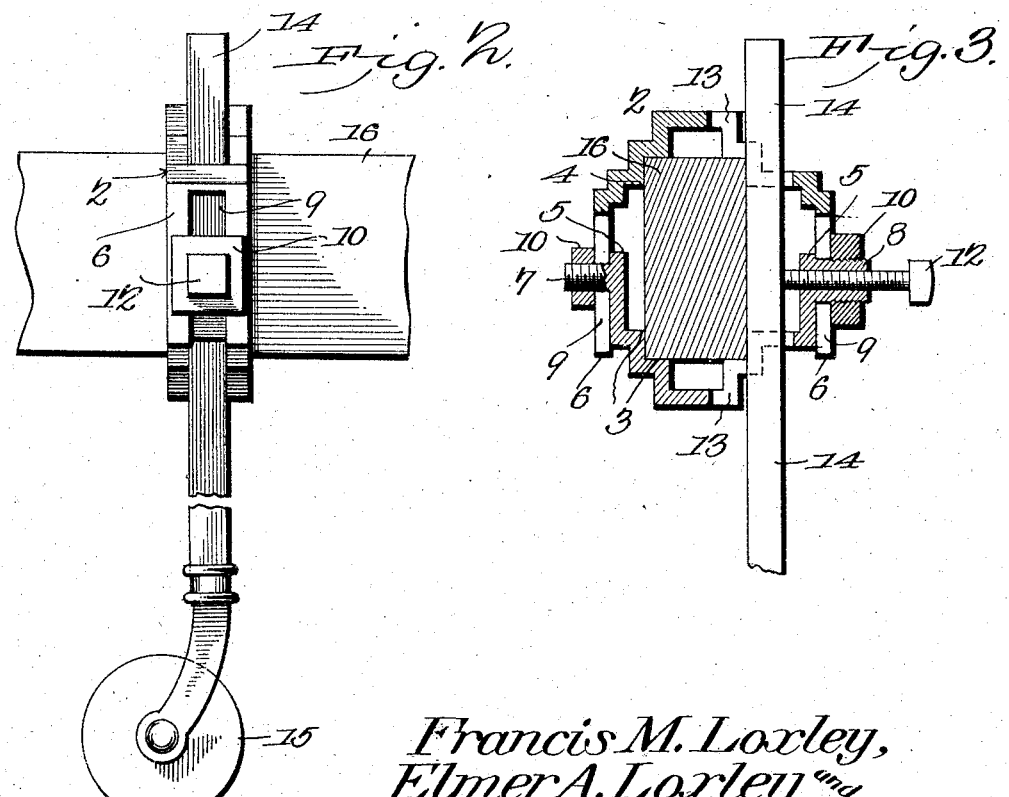
Francis M. Loxley,
Elmer A. Loxley and
Walter M. Loxley,
Inventors.

No. 780,721. Patented January 24, 1905.

UNITED STATES PATENT OFFICE.

FRANCIS M. LOXLEY, ELMER A. LOXLEY, AND WALTER M. LOXLEY, OF LEWISBURG, OHIO.

CULTIVATOR ATTACHMENT.

SPECIFICATION forming part of Letters Patent No. 780,721, dated January 24, 1905.

Application filed April 7, 1904. Serial No. 202,039.

*To all whom it may concern:*

Be it known that we, FRANCIS M. LOXLEY, ELMER A. LOXLEY, and WALTER M. LOXLEY, citizens of the United States, residing at Lewisburg, in the county of Preble and State of Ohio, have invented a new and useful Cultivator Attachment, of which the following is a specification.

This invention relates to attachments for cultivators and other agricultural implements which are equipped with earth-engaging implements serving as furrow-openers, and the improved attachment is in the nature of a gage whereby the depth of the furrow may be regulated by regulating the extent to which the earth-engaging element shall be permitted to penetrate into the soil.

The invention has for its object to provide a device of the class referred to which shall be simple in construction, durable, and inexpensive and which may be easily attached or applied to various classes of implements, the attaching means being of a nature which will permit the device to be fitted upon beams of various sizes.

The invention consists in the improved construction and combination of parts, which will be hereinafter fully described, and particularly pointed out in the claims.

In the accompanying drawings has been illustrated a simple and preferred form of embodiment of the invention, it being understood, however, that no limitation is made to the precise structural details therein exhibited, but that the right is reserved to make any changes, alterations, and modifications which may be resorted to within the scope of the invention and without departing from the spirit or sacrificing any of the advantages of the same.

In said drawings, Figure 1 is a perspective view showing the members composing the attachment separated from each other. Fig. 2 is a side elevation of a cultivator-beam having the improved device applied thereto. Fig. 3 is a transverse sectional view of the same.

Corresponding parts in the several figures are indicated by similar numerals of reference.

The improved device which is the subject of this invention is in the nature of a clamp adapted to be fitted upon cultivator-beams or upon the beams of other agricultural earth-engaging implements of various sizes or upon frame-bars with which such earth-engaging implements are connected—such as, for instance, in the case of corn-planters or other seeding-machines in connection with which the invention may be advantageously used for the purpose of regulating the extent of penetration of the furrow-openers.

The improved clamp consists of two separate members 1 and 2, each of which may be described as a yoke formed with a plurality of shoulders or offsets 3 3 and 4 4, the arms 5 of the one of said yokes 1 being capable of fitting between the arms 6 of the yoke 2. The arms 5 of the yoke 1 are provided with laterally-extending studs or bosses 7 and 8, which extend through longitudinal slots 9, formed in the arms 6 of the yoke 2, said studs or bosses being exteriorly screw-threaded for the reception of nuts 10, which when adjusted upon said studs or bosses may be used for the purpose of clamping the yokes tightly together. The stud or boss 8 is provided with a screw-threaded perforation 11 for the reception of a set-screw 12.

The yokes 1 and 2 are provided with slots 13 for the passage of a stem 14, carrying at its lower end a gage wheel or roller 15.

16 designates a cultivator-beam upon which the device has been clamped in operative position.

From the foregoing description, taken in connection with the accompanying drawings, the operation and advantages of this invention will be readily understood. The clamping device may be readily adjusted upon a beam of any of the sizes which are usually employed by simply loosening the nuts 10, which will permit the yokes or members constituting the clamp to be separated and to be adjusted upon the beam. The latter is to be fitted between any of the shoulders or offsets of the clamp which most nearly fit the beam. The yokes or members 1 2 are then held as tightly as possible against the upper and lower sides of the beam while the nuts 10 are being tightened, thereby securing the clamping device in position. The stem 14 is fitted in the slots 13, and the set-screw 12 is then adjusted to force or press the said stem into engagement with the side of the beam, thus not only securing the stem carrying the gage-wheel in the desired position, but also tightening the clamp with a great degree of security upon the beam. It is obvious that the gage-wheel may by loosening the set-screw 10 be raised or lowered, and thereby adjusted to the exact position which it is desired that it shall occupy.

This device, it will be seen, is extremely simple, it being composed of few parts, which are not liable to be misplaced, and which may be conveniently retained upon the beam, even when it is not desired to use the gage-roller. The function of the latter in regulating the extent of penetration of the earth-engaging implement in connection with which it is used is obvious.

Having thus described our invention, we claim—

1. A pair of beam-engaging yokes, one of said yokes having longitudinally-slotted arms and the other yoke having arms provided with laterally-extending exteriorly-screw-threaded studs, and nuts upon the latter.

2. A beam-engaging clamp consisting of two yokes having shoulders or offsets, one of said yokes having longitudinally-slotted arms and the other yoke having arms provided with laterally-extending, exteriorly-screw-threaded studs, and nuts upon the latter.

3. A beam-engaging clamp consisting of two beam-engaging yokes, having shoulders or offsets and slotted for the passage of a gage-wheel-carrying stem, means for connecting said yokes, and tightening means extending through overlapping arms at one side of said yokes to engage the gage-wheel-carrying stem.

4. A beam-engaging clamp consisting of a pair of yokes having shoulders or offsets and provided with alining slots, one of said yokes being provided with longitudinally-slotted arms and the other yoke having arms provided with laterally-extending screw-threaded studs, and nuts upon the latter, and a set-screw extending through a perforation in one of said studs.

5. A clamping device consisting of a pair of adjustably-connected beam-engaging yokes having shoulders or offsets, and slots for the passage of a gage-wheel-carrying stem, and a set-screw extending through overlapping arms of said clamping device and adapted to bear against the gage-wheel-carrying stem.

6. A clamping device comprising a pair of members adapted to coöperate to include a beam between them; said members having, each, a plurality of shoulders or offsets to engage beams of various sizes, means for clamping said members together, a stem insertible through slots in said coöperating members, and a set-screw extending through the clamping device to bear against said stem.

In testimony that we claim the foregoing as our own we have hereto affixed our signatures in the presence of two witnesses.

FRANCIS M. LOXLEY.
ELMER A. LOXLEY.
WALTER M. LOXLEY.

Witnesses:
HENRY HABEKOST,
O. SHEPPARD.